United States Patent

[11] 3,622,858

| [72] | Inventor | Clair Emerson Mitchell<br>Detroit, Mich. |
|---|---|---|
| [21] | Appl. No. | 85,185 |
| [22] | Filed | Oct. 29, 1970 |
| [45] | Patented | Nov. 23, 1971 |

[54] ELECTRICAL GENERATING SYSTEM FOR AN AUTOMOTIVE VEHICLE
18 Claims, 3 Drawing Figs.

[52] U.S. Cl. ................................................ 320/64,
320/31, 322/18, 322/28
[51] Int. Cl. .............................................. H02j 7/14
[50] Field of Search .......................... 322/18, 28,
32, 73; 320/31, 61, 64, 68

[56] References Cited
UNITED STATES PATENTS

| 3,496,443 | 2/1970 | Snedeker et al. | 320/64 |
| 3,522,482 | 8/1970 | Thompson | 322/28 |
| 3,467,853 | 9/1969 | Harland, Jr. et al. | 322/28 |
| 3,496,447 | 2/1970 | Thompson | 322/28 |
| 3,129,378 | 4/1964 | Raven et al. | 322/28 |
| 3,553,563 | 1/1971 | Kawashima | 320/61 |

Primary Examiner—J. D. Miller
Assistant Examiner—John M. Gunther
Attorneys—John R. Faulkner and Keith L. Zerschling ABSTRACT: An electrical generating system for use on an automotive vehicle in which the output of an electrical generator, preferably in the form of an alternator, is controlled by a voltage regulator or limiter, preferably of the solid state type. The control or field winding of the alternator is energized through the voltage regulator, which includes a normally open switch, preferably of the solid state type, connected to be energized from the storage battery of the vehicle and the output windings of the alternator through a rectifier. Means are employed responsive to the drop in the terminal voltage of the storage battery when the starter motor of the vehicle is energized to switch the normally open switch into a conducting or closed state thereby permitting the field winding or control winding of the alternator to be energized from the storage battery and the rectifier.

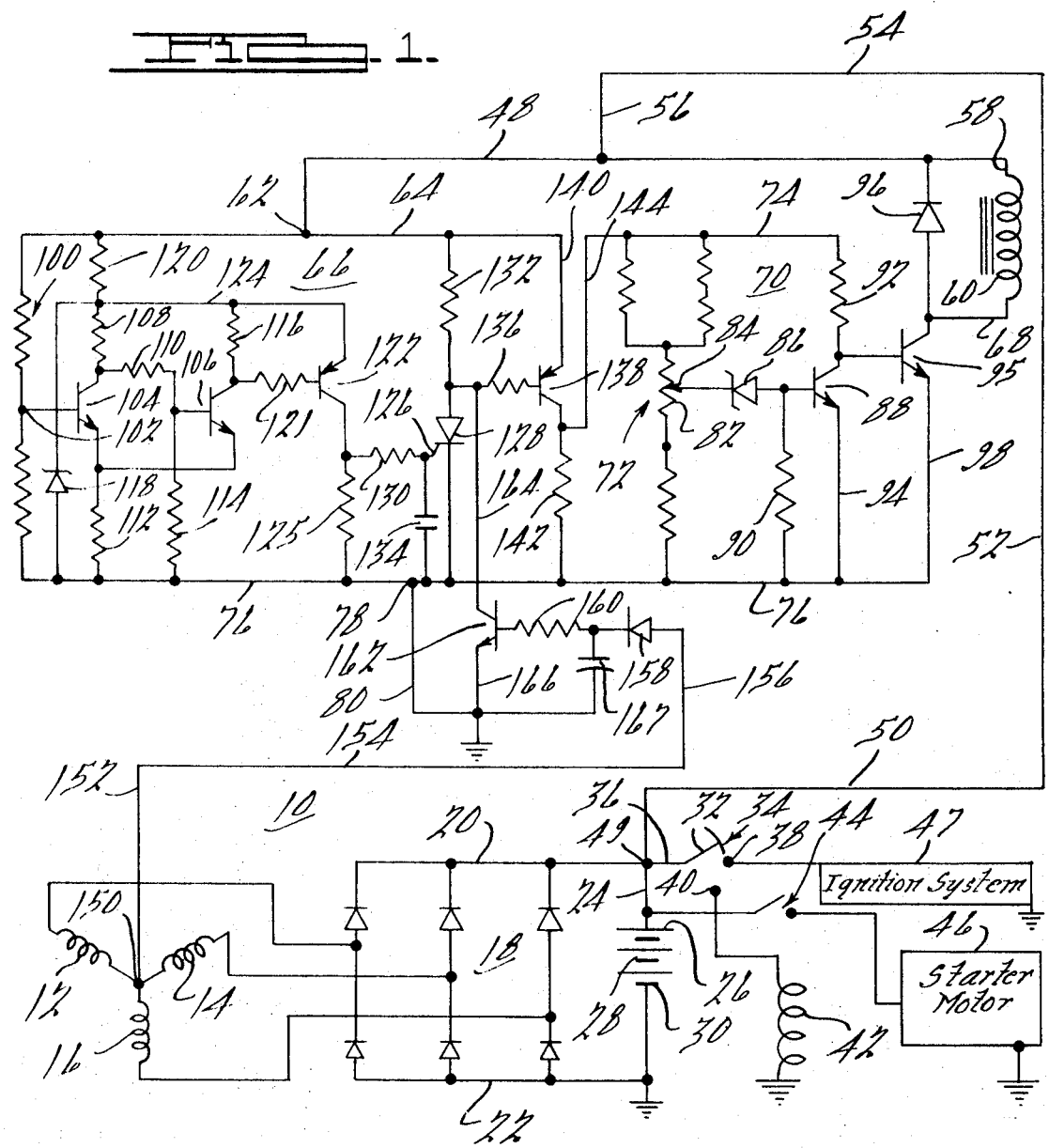

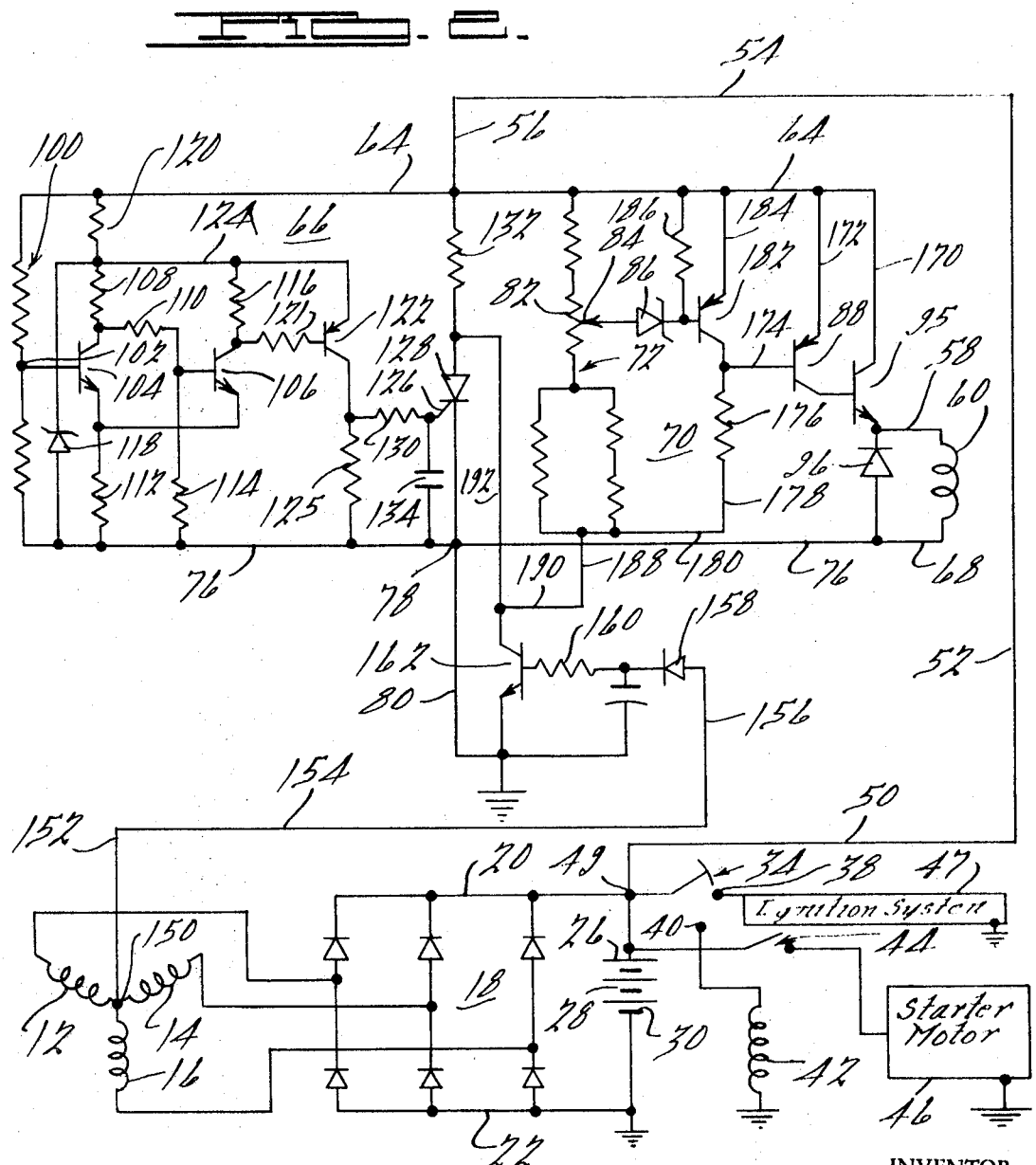

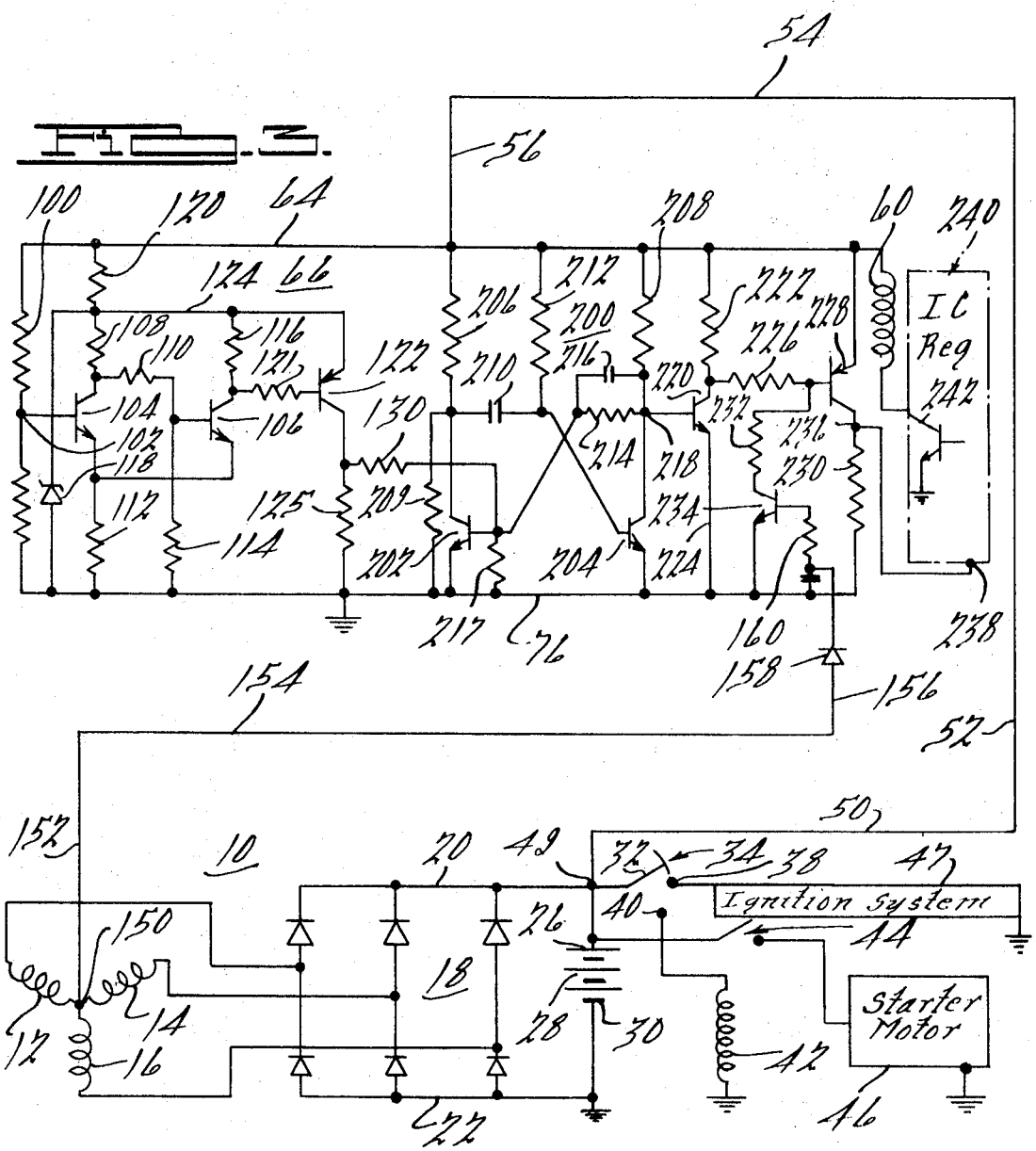

3,622,858

ELECTRICAL GENERATING SYSTEM FOR AN AUTOMOTIVE VEHICLE

BACKGROUND OF THE INVENTION

This invention relates to electrical generating systems for use on motor vehicles and, more particularly, to a means for energizing or switching a voltage regulator, preferably of the solid state type, into a conductive or operative mode in response to the lowering of the terminal voltage of the vehicle storage battery during engine starting operations.

In modern day automotive vehicles, the alternating current generator or alternator is employed to generate electrical energy which is used to charge the storage battery of the vehicle and to supply power to the various loads in the vehicle, for example, headlamps, radios and other electrically powered accessories. These alternators generally employ solid state rectifying systems for rectifying the alternating current energy produced in the alternator windings. When the alternator is at rest and is not producing electrical energy, these rectifiers block current flow from the storage battery of the vehicle to the alternator output windings thereby preventing discharge of the storage battery through these windings.

In addition, a means for isolating the electrical storage battery from the field winding of the alternator is required during periods of inoperativeness. This is necessary to prevent discharge of the battery due to current through the field winding during such periods of inoperativeness. The most commonly used means of achieving this isolation is an electromechanical relay or switch which has a winding energized from the output windings of the alternator. When the alternator is at rest, this relay is open thereby providing an open circuit between the battery and the field winding. When the alternator commences to operate, a voltage from the output windings is applied to the relay winding thereby closing the relay contacts. Closing of the relay contacts energizes the field winding from the source of electrical energy or storage battery and the DC terminals of the rectifier connected to the alternator output windings through a voltage regulator, which may be either of the electromechanical type or of the solid state switching type.

There have been a number of suggestions in the prior art for utilizing solid state devices responsive to the output voltage of the alternator for energizing, or switching into an operative state, a solid state voltage regulator connected to control the amount of electrical energy supplied to the field winding from the storage battery of the vehicle and the DC output terminals of the alternator. Typical examples of these circuits and others similar to them are found in U.S. Pat. Nos. 3,129,378; 3,293,536; 3,136,940; 3,467,853; 3,456,182; 3,496,443; 3,443,193 and 3,476,950.

The present invention provides a novel and unique means for energizing or bringing into an operative state the voltage regulator coupled to the control or field winding of the alternator. In the present invention, this takes place during the starting operations of an internal combustion engine for the vehicle and is accomplished in response to the drop in the terminal voltage of the storage battery of the vehicle when the starter motor for the internal combustion engine is energized.

SUMMARY OF THE INVENTION

This invention, in its preferred form, includes an alternator having output windings and a rectifier connected thereto for supplying electrical energy to a vehicle storage battery and to the other electrical loads of the vehicle. A control or field winding is included within the alternator for controlling the output voltage of the alternator windings and the DC voltage appearing across the rectifier in accordance with the level of energization of this field or control winding. A voltage regulator is connected to the storage battery and the DC terminals of the rectifier and to the control winding for providing this controlled energization of the field winding. This voltage regulator may be of the solid state type having solid state switching means connected in series with the field winding and the common terminals of the electrical storage battery and the rectifier. This solid state switching means is normally in a nonconductive state thereby blocking current flow from the electrical storage battery through the field winding, and thus, preventing discharge of the electrical storage battery through the field winding when the system is in an inoperative state or condition.

In the present invention, means are coupled to the electrical storage battery and to the voltage regulator for switching the voltage regulator, including the normally nonconducting solid state switching means, into an operative or conducting condition in response to the voltage drop in the terminal voltage of the electrical storage battery during starting operations of the internal combustion engine of the automotive vehicle.

It is well known that a starter motor for an internal combustion engine draws very large amounts of current when energized and that this large draw in current substantially reduces the terminal voltage of the electrical storage battery. For example, the terminal voltage of the storage battery may drop from a nominal 12 volts to a value in the region of 10 volts when the starter motor is energized. The means for switching the regulator and the solid state switching means to an operative or conducting state includes solid state switching circuits coupled to the electrical storage battery and the voltage regulator. Included within these circuits is a voltage level sensing means which senses the above mentioned lowering of the terminal voltage of the storage battery during starting operations. Means are connected to the voltage level sensing means for causing current flow through the control electrode of normally nonconducting solid state switching means and thus causing the solid state switching means, and hence, the voltage regulator to be switched into its operative or conducting states.

Additionally, means are coupled to the output windings of the alternator and to these solid state circuits for maintaining the voltage regulator in its operative condition and the solid state switching means, coupled to the electrical storage battery and the field winding, in a conducting state when the terminal voltage of the storage battery returns to its normal or nominal terminal voltage after starting operations of the internal combustion engine have been completed.

Thus, the present invention provides means for eliminating the need for the conventional relay or switch described above for preventing discharge of a vehicle storage battery through the field winding of a generator or alternator when the generator or alternator is in an inoperative or at rest condition. It automatically switches the regulator into an operative state during normal engine starting operations and maintains the regulator in an operative condition until the alternator ceases to produce an appreciable voltage output.

In addition, the present invention may be completely self-contained with a solid state voltage regulator thereby permitting a single wire connected to the alternator output, the vehicle storage battery and the regulator to accomplish the above mentioned purposes.

An object of the present invention is the provision of means in an electrical generating system for an automotive vehicle for preventing the electrical storage battery of the vehicle from discharging through the field winding of a generator or alternator during periods of inoperativeness of the generator or alternator.

A further object of the invention is the provision of a means included within a voltage regulator for an alternator or generator of an automotive vehicle for preventing discharge of the electrical storage battery of the vehicle through the generator or alternator field winding during periods of inoperativeness of the generator or alternator, and including means responsive to the lowering of the terminal voltage of the electrical storage battery during engine starting operations for switching the voltage regulator into an operative condition and for connecting the field winding of the alternator or generator to the electrical storage battery.

BRIEF DESCRIPTION OF THE DRAWINGS

FIG. 1 is a circuit diagram of one embodiment of the present invention;

FIG. 2 is a circuit diagram of another embodiment of the present invention; and

FIG. 3 is a circuit diagram of yet another embodiment of the present invention.

DESCRIPTION OF THE PREFERRED EMBODIMENT

Referring now to the drawings in which like reference numerals designate like parts throughout the several views thereof, there is shown in FIG. 1 an electrical generator for an automotive vehicle. This electrical generator is in the form of an alternator 10 having output windings 12, 14 and 16 connected in the conventional Wye configuration. These windings are suitably connected to a full-wave rectifier 18 which includes a positive DC output terminal 20 and a negative DC output terminal 22. The positive DC output terminal 20 is connected through lead 24 with the positive terminal 26 of a source of electrical energy, preferably in the form of a storage battery 28. The negative DC output terminal 22 of the rectifier 18 is connected to ground and to the negative terminal 30 of the electrical storage battery 28.

A movable conductive arm 32 of an ignition switch 34 is connected to the positive terminal 20 of the rectifier 18 through lead 36 and also to the positive terminal 26 of electrical storage battery 28 through the lead 36 and the lead 24. The ignition switch 34 includes an "ON" terminal 38 and a "START" terminal 40. When the ignition switch 34 is moved to the "START" position, the movable conductive arm 32 engages both the "ON" terminal 38 and the "START" terminal 40. Engagement with the "START" terminal 40 energizes relay winding 42 from the positive terminal 26 of the source of electrical energy 28 thereby closing relay contacts 44 and energizing starter motor 46 from the positive terminal 26 of the electrical storage battery 28. The starter motor 46 is coupled to the internal combustion engine of the automotive vehicle employing the present invention and is employed to crank and start this internal combustion engine. As is conventional, the starter motor 46 draws a very large amount of current, when energized, thereby lowering the terminal voltage of the electrical storage battery 28 by a substantial and significant amount. For example, if the electrical storage battery 28 has a nominal terminal voltage of 12 volts, its terminal voltage during periods when the starter motor 46 is energized and is drawing current may drop to the region of 10 volts.

When the ignition switch 34 is closed in either the "START" or the "ON" position so that the conductive movable arm 32 is in engagement with the "ON" terminal 38, the ignition system 47 of the internal combustion engine is energized.

A line 48 is energized through lead 50, connected to the junction 49 positioned at the junction of DC output terminal 20 and lead 24, and through lead 52, lead 54 and lead 56. The lead 48 is, in turn, connected to one terminal 58 of the control or field winding 60 for the alternator 10. Additionally, the line 48 is connected at junction 62 to a line 64 of a solid state energizer circuit means generally designated by the numeral 66.

The other terminal 68 of the field winding 60 is connected to a conventional solid state voltage regulator means generally designated by the numeral 70. This voltage regulator 70 comprises a voltage divider 72 connected between lines 74 and 76. The line 76 is, in turn, connected to ground via junction 78 and lead 80. The voltage divider 72 includes a variable resistor 82 having a movable arm 84 connected to one terminal of zener diode 86. The other terminal of zener diode 86 is connected to the base or control electrode of a first transistor 88, the this base or control electrode is connected to line 76 through a resistor 90. The collector of the first transistor 88 is connected to line 74 through a resistor 92 and the emitter thereof is connected to grounded line 76 through a lead 94. The collector of the first transistor 88 also is connected to the base or control electrode of a second or output transistor 95 which has its collector connected to the filed winding 60 of the alternator 10 and to a transient suppression diode 96. This diode is connected across the field winding 60. The emitter of the second or output transistor 95 is connected to grounded line 76 through a lead 98.

The solid state energizer circuit means 66 comprises a voltage divider 100 connected between line 64 and line 76 and having a terminal 102 connected to the base electrode of a transistor 104 which, in combination with transistor 106, comprises a voltage level detector in the form of a nonsaturating Schmitt trigger. The two transistors 104 and 106, together with resistors 108, 110, 112, 114 and 116, comprise the Schmitt trigger. A zener diode 118 having one terminal connected to grounded line 76 and the other terminal connected to energized line 64 through resistor 120 establishes a reference voltage level for the voltage level detector in the form of the Schmitt trigger. The voltage divider 100 applies, through junction 102, a portion of the voltage that appears on line 64 to the control or base electrode of transistor 104.

When the terminal voltage of the electrical storage battery 28 is at its nominal level, that is, when the starting motor 46 is not energized, the voltage on line 64 will be such that the transistor 104 of the Schmitt trigger will be in a conducting state, and the transistor 106 will be in a nonconducting state.

The collector of transistor 106 is connected through a resistor 121 to the base or control electrode of a transistor 122 and the emitter of this transistor is connected to line 124 which, in turn, is fed from line 64 through resistor 120. The collector of transistor 122 is connected to grounded line 76 through resistor 125 and to the control electrode 126 of a controlled rectifier 128 via resistor 130. The output electrodes, i.e. the anode and cathode, of the controlled rectifier 128 are connected in series with a resistor 132 and this series circuit is connected across line 64 and grounded line 76. Additionally, a capacitor 134, used for transient suppression purposes, is connected between the control electrode 126 and the grounded line 76.

The junction between the anode of the controlled rectifier 128 and the resistor 132 is connected through resistor 136 to the base of another transistor 138. The emitter of transistor 138 is connected to line 64 through lead 140 and the collector thereof is connected to grounded line 76 through a resistor 142. A junction intermediate the collector of transistor 138 and the resistor 142 is connected through lead 144 to the line 74 which is a part of the solid state voltage regulator 70.

The neutral point 150 of the Wye connected alternator output windings 12, 14 and 16 is connected through leads 152, 154, 156, rectifying diode 158 and resistor 160 to the control or base electrode of transistor 162. The collector of this transistor is connected through lead 164 to the control or base electrode of transistor 138 through resistor 136, and the emitter of transistor 162 is connected to ground through lead 166. In addition, a capacitor 167 has one terminal connected intermediate resistor 160 and diode 158 and the other terminal thereof connected to ground.

As previously stated, when line 64 is energized from the storage battery 28 during conditions other than starting operations of the internal combustion engine, the voltage on line 64 will be such that the transistor 104 of the level detector or Schmitt trigger will be in a conducting state and the transistor 106 will be in a nonconducting state. With transistor 106 in a nonconducting state, transistor 122 is also in a nonconducting state since there is no path for base current to flow through resistor 121. With transistor 122 in a nonconducting state, current cannot flow into the control electrode 126 of controlled rectifier 128, and, therefore, controlled rectifier 128 will be in a nonconducting state. This prevents current flow out of the base of transistor 138 thereby maintaining it in a nonconducting state. With transistor 138 in a nonconducting state, line 74 of the solid state voltage regulator 70 will not be energized, and hence, no current can flow into the base of output transistor 95. This keeps output transistor 95 in a nonconducting state and blocks current flow through the field winding 60 from the line 48 and from the positive terminal 26 of the electrical storage battery 28.

Since the field winding 60 is not energized, the voltage at the neutral point 150 of alternator 10 will be at a very low level even though the rotor of the alternator may be rotating, and this voltage is insufficient when applied through leads 152, 154, 156, rectifying diode 158 and resistor 160 to the base of transistor 162 to switch it to a conducting state. Therefore, transistor 162 is in a nonconducting state, and current, therefore, cannot flow out of the base of transistor 138. Transistor 138, therefore, remains nonconducting, thereby keeping line 76 of the solid state voltage regulator 70 deenergized and keeping output transistor 95 in a nonconducting state.

As previously pointed out, during engine starting operations, the movable conducting arm 32 of ignition switch 34 will be moved into contact with "START" terminal 40 thereby energizing relay winding 42 and closing relay contacts 44. This energizes starting motor 46 directly from the positive terminal 26 of the source of electrical energy or storage battery 28. The heavy current drawn by the starter motor 46 significantly reduces the terminal voltage of the electrical storage battery 28 thereby significantly lowering the voltage appearing at the junction 62 and on the line 64 that is employed to supply power to the solid state energizer means 66. This reduction in voltage lowers the voltage at the junction 102 sufficiently to switch transistor 104 to a nonconducting state. The transistor 106 will, therefore, be switched to a conducting state because of the Schmitt trigger action. As a result, a current path is provided for base current from transistor 122 thereby switching it to a conducting state and applying a positive potential to the gate electrode 126 of the controlled rectifier 128. Controlled rectifier 128 will, therefore, switch to a conducting state thereby providing a path for base current from the base of transistor 138. This switches transistor 138 to a conducting state and line 74 of the solid state voltage regulator 70 will be energized from line 64 through lead 140, the emitter-collector circuit of transistor 138 and lead 144. Current may, therefore, flow into the base of the output transistor 95 from line 74 through resistor 92. This switches transistor 95 to a conducting state and permits current flow from line 48 through field winding 60, the collector-emitter circuit of transistor 95, lead 98, lead 76 and lead 80 to ground.

During starting operations, it can be appreciated that the rotor of the alternator 10 will be rotating at a speed to produce a substantial output, and a substantial voltage from neutral point 150 will be applied through leads 152, 154, 156, rectifying diode 158 and resistor 160 to the base of transistor 162 thereby switching it to a conducting state. This provides an additional path to ground for current from the base of transistor 138 thereby maintaining it in a conducting state so that the line 74 of solid state voltage regulator 70 will remain energized when starting operations have been completed and the terminal voltage of the storage battery 28 returns to its nominal level. When starter motor 46 is deenergized by moving the movable conductive arm 32 out of contact with the "-START" terminal 40, the voltage of the electrical storage battery 28 returns to its normal level thereby returning the voltage on line 64 to a normal level. This action raises the voltage at the junction 102 which is applied to the base of transistor 104 thereby switching transistor 104 back to a conducting state. This action switches transistor 106 back to a nonconducting state thereby switching transistor 122 back to a nonconducting state.

When transistor 162 is switched to its conducting state by virtue of the voltage applied to its base from the neutral point 150 of the windings 12, 14 and 16 of alternator 10, the anode of the controlled rectifier 128 is brought close to ground potential and this voltage is below the level required to maintain the controlled rectifier in a conducting state. Thus, the controlled rectifier is switched to a nonconducting state and the base current from transistor 138, therefore, flows solely through the transistor 162.

When the internal combustion engine is operating the output of the alternator 10 that appears at the DC terminals 20 and 22 is controlled by the solid state voltage regulator 70 in the conventional manner by periodic energization and deenergization of the field winding 60. When this output voltage reaches the control voltage level, the zener diode 86 breaks down thereby causing current to flow into the base of transistor 88 and switching this transistor to a conducting state. Switching of transistor 88 to a conducting state deprives output transistor 95 of base current and transistor 95 switches to a nonconducting state thereby deenergizing field winding 60. When the output voltage of the alternator 10 falls to a lower level due to the deenergization of field winding 60, the zener diode 86 returns to a current blocking condition thereby depriving transistor 88 of base current and switching it to a nonconducting state. This action drives base current into the base of transistor output 95 thereby switching it to a conducting state and energizing filed winding 60. This action continues on a cyclic basis.

When the internal combustion engine of the vehicle is returned to an inoperative condition by moving the conductive arm 32 of ignition switch 34 out of engagement with "ON" terminal 38, the ignition system 47 is deenergized. As a result, the internal combustion engine that drives alternator 10 will cease to rotate. The output voltage appearing at the neutral point 150 of alternator 10 will, therefore, fall to a low level and when it falls to a certain low level, for example, 2 volts, (when a storage battery having a nominal voltage of 12 volts is employed) the current into the base of transistor 162 will no longer be sufficient to maintain this transistor in a conducting state. As a result, transistor 162 will switch to a nonconducting state thereby switching transistor 138 to a nonconducting state. Switching of transistor 138 to a nonconducting state deenergizes line 74 of the solid state voltage regulator 70. This action will cause transistor 95 to be switched to a nonconducting state since current is no longer available for its base. This action again cuts off current flow through field winding 60. The system of the present invention is then ready for another engine start sequence.

FIG. 2 shows another embodiment of the invention in which the terminal 68 of the field winding 60 is grounded through lines 76 of lead 80, and the collector circuit of output transistor 95 is connected through lead 170 with line 64. Also, the first transistor 88 has its emitter connected to line 64 via lead 172, its collector connected to the base of transistor 95, and its base connected through lead 174, resistor 176 and lead 178 to a line 180.

A third transistor 182 is provided having its emitter connected to line 64 via lead 184 and its collector connected to the junction of lead 174 and resistor 176 and, hence, to the base of transistor 88. The base of transistor 182 is connected to line 64 via resistor 186 and its base is also connected to one terminal of zener diode 86. In this embodiment of the invention, the line 180 is connected directly to the anode of controlled rectifier 128 via leads 188, 190 and 192 and also directly to the collector of transistor 162 via leads 188 and 190.

The operation of this circuit is very similar to that of the embodiment shown in FIG. 1. When the controlled rectifier 128 and transistor 162 are in nonconducting states, line 180 is essentially connected to the voltage appearing on line 64 through resistor 132. Thus, transistor 88 will be in a nonconducting state since there is no path for base current from this transistor. With transistor 88 in a nonconducting state, transistor 95 will also be in a nonconducting state and field winding 60 will remain deenergized. During starting operations, the voltage on line 64 will drop and through the operation previously described with respect to the solid state energizer means 66, the controlled rectifier 128 will be switched to a conducting state thereby connecting lead 180 to ground through the controlled rectifier output circuit. As a result, transistor 88 will be switched to a conducting state since current may flow out of its base through lead 174, resistor 176 and lead 178 to line 180. This, in turn, switches transistor 95 to a conducting state and energizes the field winding 60.

When the alternator 10 produces substantial output voltage, the voltage applied from the neutral point 150 of the windings 12, 14 and 16 to the base of transistor 162 will switch this transistor to a conducting state thereby connecting line 180 to ground through the collector-emitter circuit of transistor 162. Thus, when starting operations have been terminated and controlled rectifier 128 is switched back to its nonconducting state, the solid state voltage regulator 70 remains energized to control the energization of the field winding 60 and the output of the alternator 10.

The solid state voltage regulator 70 operates in a cyclic manner similar to the solid state voltage regulator 70 disclosed in relationship to FIG. 1. In FIG. 2, however, when the voltage level reaches the desired or control voltage level, the zener diode 86 will break down thereby switching transistor 182 to a conducting state. This brings the potential of the base of transistor 88 near to the potential of its emitter thereby switching transistor 88 to a nonconducting state. Switching of transistor 88 to a nonconducting state switches transistor 95 to a nonconducting state thereby deenergizing field winding 60. When the output voltage of the alternator 10 falls below the controlled or desired voltage output level by a certain amount, the zener diode 86 again comes into its blocking state thereby switching transistor 182 to a nonconducting state and switching transistors 88 and 95 back to their conducting states. This permits the energization of the control or field winding 60. The above action takes place on a cyclic basis to control or limit the voltage output of the alternator 10.

FIG. 3 shows another embodiment of the invention with a turnoff delay feature and with an integrated circuit regulator. In this embodiment of the invention, the collector of transistor 122 is connected through resistor 130 to a monostable flip-flop circuit 200. This monostable flip-flop circuit comprises a first transistor 202 and a second transistor 204. The emitters of these two transistors are connected to grounded line 76 while the collectors thereof are connected to line 64 through resistors 206 and 208, respectively. A resistor 209 is connected across the emitter-collector of transistor 202 to clamp the voltage at the collector to a value less than the zener voltage of the emitter-base of transistor 204. The base of transistor 204 is connected to the collector of transistor 202 through a capacitor 210 and to the line 64 through a resistor 212. Similarly, the base of transistor 202 is connected to the collector of transistor 204 through a parallel combination of a resistor 214 and a capacitor 216. In addition, the base of transistor 202 is connected to grounded line 76 through a resistor 217.

A junction 218 intermediate the collector of transistor 204 and resistor 208 is connected to the base of a transistor 220 which has its collector connected to line 64 through resistor 222 and its emitter connected to grounded line 76 through lead 224. The collector of transistor 220 is connected through resistor 226 to the base of transistor 228. The emitter of this transistor is connected directly to line 64 and its collector is connected to grounded line 76 through resistor 230. In addition, the base of transistor 228 is connected to grounded line 76 through resistor 232 and the emitter-collector circuit of transistor 234. The base of transistor 234 is connected to the neutral point 150 of alternator windings 12, 14 and 16 via the leads 152, 154, 156, rectifying diode 158 and resistor 160.

The junction 236 intermediate the collector of transistor 228 and the resistor 230 is connected to a control terminal 238 of an integrated circuit voltage regulator 240 having an output transistor 242 connected in series with field winding 60.

Prior to starting operations and with the internal combustion engine of the vehicle employing the present invention at rest, the terminal voltage of the electrical storage battery 28 will be applied to the line 64. As was the case with the embodiments described in relation to FIGS. 1 and 2, the transistor 104 will be in a conducting state, while transistors 106 and 122 will be in a nonconducting state. In this condition, transistor 202 will be in a nonconducting state and transistor 204 will be in a conducting stage. With transistor 204 is a conducting state, transistor 220 will be in a nonconducting state and transistor 228 will be in a nonconducting state. With transistor 228 in a nonconducting state, the integrated circuit regulator 240 will be inoperative or in an unenergized condition.

During starting operations when the starter motor is energized and the terminal voltage of the electrical storage battery 28 drops significantly, transistor 104 will switch to a nonconducting state, transistor 106 will switch to a conducting state, as will transistor 122. This action is the same as that described previously in relationship to the embodiments shown in FIGS. 1 and 2. When transistor 122 switches to a conducting state, it will apply a positive pulse of electrical energy to the base of transistor 202 thereby switching it to a conducting state. The transistor 204 of the monostable flip-flop circuit 200 will, therefore, switch to a nonconducting state. Switching of transistor 204 to a nonconducting state provides base current drive for transistor 220 thereby switching it to a conducting state. This, in turn, permits base current to flow out of transistor 228 thereby switching it to a conducting state and energizing the integrated circuit regulator to permit it to energize field winding 60 through output transistor 242.

Transistor 204 will remain in a nonconducting state for a time period, determined by the time constant of the resistor 212 and the capacitor 210. Transistor 122 is returned to its nonconducting state at the termination of starting operations when the voltage on line 64 again returns to the nominal terminal voltage of storage battery 28.

If the internal combustion engine in the vehicle employing the present invention has started prior to transistor 204 switching back to its conducting state at the end of the time delay determined by the time constant mentioned above, an input voltage will be received at the base of transistor 234 from the neutral point 150 of alternator 10 thereby switching transistor 234 to a conducting state. When transistor 234 switches to a conducting state, base current may flow out of transistor 228 to grounded line 76 through the collector-emitter circuit of transistor 234 thereby keeping the integrated circuit regulator 240 energized. If, however, a false start occurs and the input voltage is not applied to the base of transistor 234 from the neutral point 150 of alternator 10 prior to the end of the time delay or time constant period mentioned above, transistor 228 will switch to a nonconducting state and the integrated circuit regulator will be switched to an inoperative condition thereby deenergizing field winding 60.

In addition, if normal starting conditions prevail and the engine starts properly to provide the voltage on the base of transistor 234, the integrated circuit regulator 240 will operate during normal operating conditions to control the energization of control or field winding 60 thereby controlling the output voltage of alternator 10. When the ignition system 47 is switched to its inoperative or off state, the internal combustion engine will cease to rotate and will cease to drive the rotor of the alternator 10. As a result, the signal received at the base of transistor 234 will cease thereby switching this transistor to a nonconducting state and switching transistor 228 to a nonconducting state. This again switches the integrated circuit regulator 240 to its inoperative condition.

Thus, the embodiment of FIG. 3 provides a positive mechanism for switching the voltage regulator employed with the present invention to a nonconducting state should false starts occur and the vehicle operator removes the ignition key and leaves the vehicle. This prevents the discharge of the battery 28 through the field winding 60 should this set of circumstances occur.

Thus, the invention provides a very reliable means for preventing discharge of the electrical storage battery of an automotive vehicle through the field winding of an electrical generator, for example, an alternator. Additionally, it provides a means responsive to the voltage drop in the terminal voltage of the storage battery for switching the voltage regulator employed with the field winding to a conductive or operative condition so that it can properly control the voltage output of the generator or alternator. The wiring is very uncomplicated since only a single wire in the form of the leads designated by the numerals 50, 52 and 54 need be employed to connect the electrical storage battery and the rectifier to the voltage regulator and solid state energizer.

We claim:

1. In a generating system for an automotive vehicle the combination comprising an electrical generator having output windings an a control winding, an electrical storage battery coupled to said output windings, a voltage regulating means including a solid state switching device having an output circuit and a control electrode, circuit means coupling said field winding to said electrical storage battery and said output windings through said output circuit of said solid state switching device, an electrical starter motor, manually movable means coupled to said starter motor and said electrical storage battery for energizing said starter motor from said source of electrical energy, and means coupled to said electrical storage battery and said control electrode for switching said solid state switching device to a state where said field winding is energized from said electrical storage battery through said output circuit of said solid state switching device in response to the reduction of the voltage of said electrical storage battery when said manually movable means is moved to couple said electrical storage battery to said electrical starter motor.

2. The combination of claim 1 and further comprising means coupled to said output windings of said electrical generator and to control electrode of said solid state switching device for maintaining said solid state switching device in said state where said field winding is energized when the voltage developed in said output windings is above a predetermined level.

3. The combination of claim 2 and further comprising time delay means coupled to control electrode of said solid state switching device for switching said solid state switching device to a state where said field winding is not energized a predetermined time period after said manually movable means is moved to deenergize said starter if the voltage developed in said output windings is below said predetermined level.

4. In an automotive vehicle, an electrical generating system comprising a generator having an output winding and a field winding, an electrical storage battery, and electrical starter motor, a voltage regulator coupled to said electrical storage battery and having an output means coupled to field winding, said output means including normally open switch means connected in series with said field winding, manually movable means coupled to said electrical storage battery and to said starter motor for energizing said starter motor from said electrical storage battery when said manually movable means is moved from a first to a second position, and means coupled to said electrical storage battery and said output means of said voltage regulator and responsive to the reduction in the terminal voltage of said electrical storage battery when said starter motor is energized from said electrical storage battery by movement of said movable means from the first to the second position, for closing said normally open switch means.

5. The combination of claim 4 in which said output means of said voltage regulator comprises a solid state switching means having output electrodes connected in series with said field winding and a control electrode coupled to said last mentioned means.

6. The combination of claim 5 and further comprising means coupled to said output winding of said electrical generator and to said control electrode of said solid state switching means for maintaining said solid state switching means in a closed condition when the voltage developed in said output winding is above a predetermined level.

7. The combination of claim 6 and further comprising time delay means coupled to said control electrode of said solid state switching means for returning said solid state switching means to an open condition a predetermined time period after said manually operable means is moved to deenergize said starter motor if the voltage developed in said output winding is below said predetermined level.

8. The combination of claim 4 and further comprising means coupled to said output winding of said electrical generator and to said normally open switch means for maintaining said normally open switch means in a closed condition when the voltage developed in said output windings is above a predetermined level.

9. The combination of claim 8 and further comprising time delay means coupled to said normally open switch means for returning said normally open switch means to an open condition a predetermined time period after said manually operable means is moved to deenergize said starter motor if the voltage developed in said output winding is below said predetermined level.

10. In an automotive vehicle, an electrical generating system comprising a generator having an output winding and a field winding, an electrical storage battery, an electrical starter motor, manually movable means coupled to said electrical storage battery and to said electrical starter motor and movable from a first position to a second position for energizing said starter motor from said electrical storage battery when in said second position, switch means connected in circuit with said electrical storage battery and said field winding for blocking current from said electrical storage battery through said field winding when in one state and for permitting current flow from said electrical storage battery through said field winding when in said other state, and means coupled to said electrical storage battery and to said switch means and responsive to the reduction in the terminal voltage of said electrical storage battery when said starter motor is energized from said electrical storage battery by movement of said movable means from said first position to said second position, for switching said switching means from said one state to said other state.

11. The combination of claim 10 in which said last mentioned means comprises a voltage level detector changeable between a first state and a second state upon said reduction of the terminal voltage of said electrical storage battery, an output circuit means coupled to said voltage level detector and to said switch means and responsive to the changing of said voltage level detector from said first state to said second state for applying a signal to said switch means for switching said switching means to said other state.

12. The combination of claim 11 and further comprising means coupled to said output winding of said electrical generator, said voltage level detector and said output circuit means for maintaining said output circuit means in a condition to maintain said signal when the voltage of said output winding is above a predetermined level.

13. The combination of claim 12 and further comprising time delay means coupled to said voltage level detector and said output circuit means for changing said voltage level detector back to said first state a predetermined time period after said manually movable means is moved from said second position back to said first position, and for terminating the signal applied to said switch means from said output circuit means after said given time period if the voltage of said output winding is below said predetermined level.

14. The combination of claim 10 in which said switch means is a solid state switching device having output electrodes connected in series with said electrical storage battery and said field winding and a control electrode coupled to said last mentioned means.

15. The combination of claim 14 in which said last mentioned means comprises a solid state switching means having an output circuit coupled to said control electrode of said solid state switching device and a control electrode, a voltage level detector means switchable from a first state to a second state when the reduction of the terminal voltage of said electrical storage battery is sensed, means coupled to said voltage level detector and said control electrode of said solid state switching means for switching said solid state switching means to a conducting state when said voltage level detector is switched to said second state, and means coupled to said solid state switching means, and to said output windings of said electrical generator for maintaining said solid state switching means in a conducting state when the output voltage of said generator appearing in said output winding reaches a predetermined level.

16. In an automotive vehicle, an electrical generating system comprising an alternator having output windings and a field winding, a solid state full wave rectifier coupled to said output windings, an electrical storage battery coupled to said rectifier, an electrical starter motor, manually operable means coupled to said electrical storage battery and to said starter motor for energizing said starter motor from said electrical storage battery, a voltage limiting means coupled to said electrical storage battery and said field winding for limiting the voltage generated in said output winding, said voltage limiting means having a first state in which said field winding is effectively out of circuit with said electrical storage battery and a second state in which said voltage limiting means controls the energization of said field winding from said electrical storage battery, and means coupled to said voltage limiting means and said electrical storage battery for switching said voltage limiting means from said first state to said second state in response to the reduction in the terminal voltage of said electrical storage battery when said starter motor is energized from said electrical storage battery by operation of said manually operable means.

17. The combination of claim 16 and further comprising means coupled to said output windings of said alternator and to said voltage limiting means for maintaining said voltage limiting means in said second state, after said manually movable means is moved to deenergize said starter motor, when the voltage developed in said output windings is above a predetermined level.

18. The combination of claim 17 and further comprising time delay means coupled to said voltage limiting means for returning said voltage limiting means to said first state a predetermined time period after said manually movable means is moved to deenergize said starter motor if the voltage developed in said output windings is below said predetermined level.

* * * * *